(12) United States Patent
Sato et al.

(10) Patent No.: US 10,957,920 B2
(45) Date of Patent: Mar. 23, 2021

(54) FUEL CELL VEHICLE

(71) Applicant: TOYOTA JIDOSHA KABUSHIKI KAISHA, Toyota (JP)

(72) Inventors: Masafumi Sato, Nagoya (JP); Keita Yamaue, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 75 days.

(21) Appl. No.: 16/366,132

(22) Filed: Mar. 27, 2019

(65) Prior Publication Data

US 2019/0305333 A1   Oct. 3, 2019

(30) Foreign Application Priority Data

Mar. 29, 2018 (JP) .............................. JP2018-064454

(51) Int. Cl.
| | |
|---|---|
| *H01M 8/04029* | (2016.01) |
| *B60K 11/04* | (2006.01) |
| *B60K 11/08* | (2006.01) |
| *B60L 50/50* | (2019.01) |
| *B60L 1/00* | (2006.01) |
| *H01M 8/04014* | (2016.01) |
| *H01M 8/04701* | (2016.01) |
| *B60L 58/33* | (2019.01) |

(52) U.S. Cl.
CPC ......... *H01M 8/04029* (2013.01); *B60K 11/04* (2013.01); *B60K 11/08* (2013.01); *B60L 1/003* (2013.01); *B60L 50/50* (2019.02); *B60L 58/33* (2019.02); *H01M 8/04014* (2013.01); *H01M 8/04701* (2013.01); *H01M 2250/20* (2013.01)

(58) Field of Classification Search
CPC ....... B60K 11/04; B60K 11/08; B60K 11/085; B60K 2001/003; B60L 1/003; B60L 2240/36; B60L 50/50; B60L 58/33; H01M 2250/20; H01M 8/04014; H01M 8/04029; H01M 8/04067; H01M 8/04649; H01M 8/04701; H01M 8/04776
See application file for complete search history.

(56) References Cited

U.S. PATENT DOCUMENTS

2004/0175602 A1* 9/2004 Tahara ............. H01M 8/04291
                                                            429/431
2014/0186732 A1   7/2014 Tachibana et al.

FOREIGN PATENT DOCUMENTS

| JP | 2006-244928 | 9/2006 |
| JP | 2011-068233 | 4/2011 |
| JP | 2013-049350 | 3/2013 |

* cited by examiner

*Primary Examiner* — Victoria H Lynch
(74) *Attorney, Agent, or Firm* — Finnegan, Henderson, Farabow, Garrett & Dunner, LLP

(57) ABSTRACT

A fuel cell vehicle capable of generating electric power in an optimum wet state is provided. A fuel cell vehicle including a fuel cell, a radiator configured to cool a coolant which has been warmed by cooling the fuel cell and send it back to the fuel cell, a grille shutter configured to adjust a flow rate of air taken into the radiator from an air intake, a sensor configured to measure an impedance of the fuel cell, and a control unit configured to control the grille shutter to open and close. The control unit controls the grille shutter to open when a measured value of the impedance becomes greater than or equal to a predetermined threshold.

2 Claims, 5 Drawing Sheets

FUEL CELL VEHICLE

CROSS REFERENCE TO RELATED APPLICATIONS

This application is based upon and claims the benefit of priority from Japanese patent application No. 2018-064454, filed on Mar. 29, 2018, the disclosure of which is incorporated herein in its entirety by reference.

BACKGROUND

The present disclosure relates to a fuel cell vehicle.

A known configuration of a fuel cell vehicle is a configuration in which a grille shutter is grounded between a front grille serving as an air intake formed at a leading end part of a vehicle front part and a radiator provided in a refrigerant circulation circuit. A flow rate of air taken into the radiator can be adjusted by adjusting an amount of opening of the grille shutter.

Japanese Unexamined Patent Application Publication No. 2013-049350 discloses a fuel cell vehicle that compares a temperature of a hydrogen fuel cell measured by a temperature sensor with a target temperature of the hydrogen fuel cell prepared in advance and controls the grille shutter to eliminate a difference between the measured temperature and the target temperature.

SUMMARY

By the way, an electrolyte membrane of a fuel cell such as a polymer electrolyte exhibits satisfactory proton conductivity in an appropriate wet state. For this reason, it is preferable to maintain the inside of the fuel cell in a wet state so that the electrolyte membrane is in an appropriate wet state during an operation of the fuel cell system. However, when the grille shutter is controlled to open and close according to the temperature of the fuel cell like in the fuel cell vehicle described in Japanese Unexamined Patent Application Publication No. 2013-049350, the fuel cell may not be maintained in an appropriate wet state.

The present disclosure has been made in view of the above-described circumstances. An object of the present disclosure is to provide a fuel cell vehicle capable of generating electric power in an optimum wet state.

A present disclosure is a fuel cell vehicle including a fuel cell, a radiator configured to cool a coolant which has been warmed by cooling the fuel cell and send it back to the fuel cell, a grille shutter configured to adjust a flow rate of air taken into the radiator from an air intake, a sensor configured to measure an impedance of the fuel cell, and a control unit configured to control the grille shutter to open and close. The control unit controls the grille shutter to open when a measured value of the impedance becomes greater than or equal to a predetermined threshold.

Wettability of an electrolyte membrane included the fuel cell can be acquired based on the impedance. That is, when the impedance rises above the predetermined threshold, it can be determined that the electrolyte membrane is slightly dry. By measuring the impedance of the fuel cell with a sensor for measuring the impedance and opening the grille shutter when the measured value of the impedance becomes greater than or equal to the predetermined threshold, it is possible to maintain the fuel cell in an appropriate wet state.

Further, the control unit may adjust an amount of opening the grille shutter according to the measured value of the impedance. When the grille shutter is opened to let traveling wind to flow from the front grille, the wettability of the electrolyte membrane included in the fuel cell can be increased but also a traveling resistance of the fuel cell vehicle is increased. Thus, it is preferable to make a flow rate of the traveling wind flowing from the front grille necessary and sufficient. By adjusting the amount of opening the grille shutter according to a value of impedance when the impedance of the electrolyte membrane of the fuel cell rises to the predetermined threshold or greater, it is possible to more appropriately maintain the wet state of the fuel cell.

Furthermore, the predetermined threshold is set according to a relationship between the impedance and the wet state of the fuel cell. In the fuel cell vehicle, by testing the relationship between the impedance and the wet state of the fuel cell in advance and setting the predetermined threshold based on a result of the test, it is possible to more appropriately maintain the wet state of the fuel cell.

According to the present disclosure, it is possible to generate electric power in an optimum wet state.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, although the present disclosure will be described with reference to an embodiment of the present disclosure, the present disclosure according to claims is not limited to the following embodiment. Moreover, all the components described in the following embodiment are not necessarily indispensable for means to solve problems. For the clarification of the description, the following description and the drawings may be omitted or simplified as appropriate. Throughout the drawings, the same components are denoted by the same reference signs and repeated descriptions will be omitted as appropriate.

First, a configuration of a fuel cell system 1 incorporated in a fuel cell vehicle according to this embodiment will be described with reference to FIG. 1.

Figure 1:
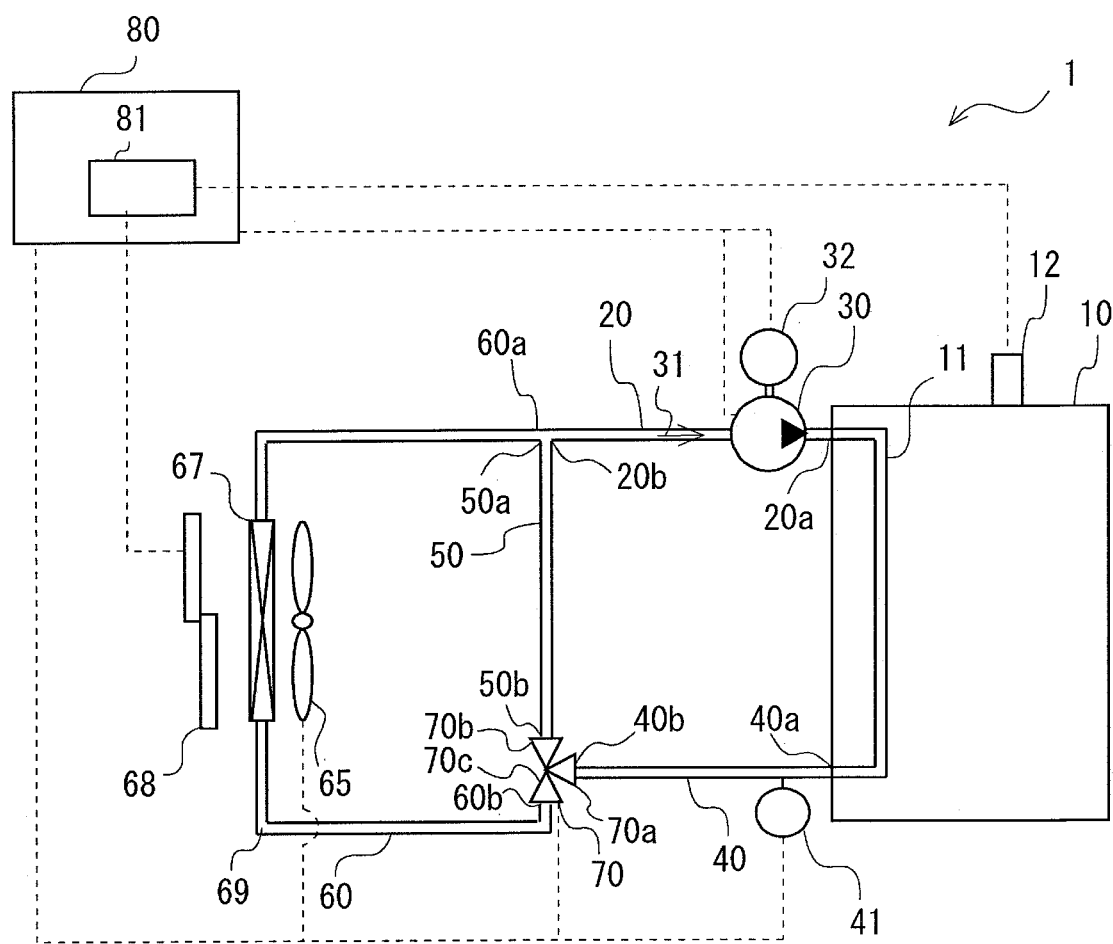
FIG. 1 is a schematic diagram showing an example of a configuration of a fuel cell system mounted on a fuel cell vehicle according to an embodiment.

FIG. 1 is a schematic diagram showing an example of a configuration of the fuel cell system 1 mounted on a fuel cell vehicle according to this embodiment. As shown in FIG. 1, the fuel cell system 1 includes a fuel cell 10, a coolant supply flow path 20, a coolant pump 30, a coolant discharge flow path 40, a bypass flow path 50, a radiator flow path 60, a radiator 67, a grille shutter 68, a rotary valve 70, and a system control ECU (Electronic Control Unit) 80. The fuel cell system 1 further includes sensors such as an impedance sensor 12, a temperature sensor 41, a pump sensor 32, and signal wiring, etc.

The fuel cell 10 is a power generation source of the fuel cell vehicle and includes an FC stack (Fuel Cell Stack) that generates electric power by causing a chemical reaction between hydrogen and oxygen. The FC stack is formed by stacking a plurality of unit cells. Each of the unit cells is formed by sandwiching an electrolyte membrane such as a solid polymer ion exchange membrane from both sides thereof by an anode electrode (a fuel electrode) and a cathode electrode (an oxidizer electrode). When the FC stack is formed by stacking several hundred unit cells, it can output a large amount of electric power necessary for driving a vehicle. In the unit cell, when anode gas containing hydrogen is supplied to the anode electrode, and air containing oxygen is supplied to the cathode electrode, hydrogen ions generated in the anode electrode by a catalytic reaction pass through the electrolyte membrane and move to the cathode electrode where the hydrogen ions and oxygen react with each other at the cathode electrode to thereby generate the electric power. In the fuel cell system 1, hydrogen is taken in from a hydrogen tank, and oxygen is taken in from the atmosphere.

In the fuel cell 10, when hydrogen ions and oxygen chemically react with each other at the cathode electrode of the above-described unit cell, heat is generated together with water. An excessive increase in the temperature of the fuel cell 10 due to the heat generated by the reaction lowers the power generation efficiency. In order to address this issue, a mechanism for cooling the fuel cell 10 is necessary.

A fuel cell flow path 11 is provided inside the fuel cell 10 and cools the fuel cell 10 by flowing a coolant 31 in the fuel cell flow path 11. The coolant 31 is, for example, an aqueous solution containing ethylene glycol. In the fuel cell system 1, the coolant is circulated through the fuel cell 10 via the coolant circulation flow path. The coolant circulation flow path includes the coolant supply flow path 20, the fuel cell flow path 11, the coolant discharge flow path 40, the bypass flow path 50, and the radiator flow path 60. The coolant circulation flow path circulates the coolant 31 by the coolant pump 30. Further, the radiator 67 is provided in the coolant circulation flow path.

The coolant supply flow path 20 is a flow path for supplying the coolant 31 to the fuel cell flow path 11 inside the fuel cell 10, and is, for example, a tubular member. One end 20*a* of the coolant supply flow path 20 is connected to the fuel cell 10, and the other end 20*b* thereof is connected to one end 50*a* of the bypass flow path 50 and one end 60*a* of the radiator flow path 60.

As described above, the coolant pump 30 is a pump that circulates the coolant 31. The coolant pump 30 is disposed in the coolant supply flow path 20. That is, an inflow port and an outflow port of the coolant pump 30 are connected to the coolant supply flow path 20. An operation of the coolant pump 30 is controlled by the system control ECU 80.

The pump sensor 32 is attached to the coolant pump 30. The pump sensor 32 acquires information about a rotational speed and power consumption of the coolant pump 30. The pump sensor 32 outputs the acquired information about the rotational speed and power consumption to the system control ECU 80.

The coolant discharge flow path 40 is a flow path for discharging the coolant 31 supplied to the fuel cell 10. The coolant discharge flow path 40 is, for example, a tubular member and serves as a flow path through which the coolant 31 flows. The coolant 31 is discharged from the fuel cell 10 to the coolant discharge flow path 40. One end 40*a* of the coolant discharge flow path 40 is connected to the fuel cell 10, and the other end 40*b* thereof is connected to the rotary valve 70.

The impedance sensor 12 is a sensor for detecting an impedance in the fuel cell 10. The impedance in the fuel cell 10 is acquired using a high frequency alternating current. The impedance sensor 12 outputs information about the acquired impedance to a control unit 81 of the system control ECU 80 via a signal line.

The temperature sensor 41 is disposed on the fuel cell 10 side in the coolant discharge flow path 40. The temperature sensor 41 acquires information about a temperature of the coolant 31 flowing through the coolant discharge flow path 40. The temperature sensor 41 outputs the acquired information about the temperature to the system control ECU 80 via a signal line.

The bypass flow path 50 is, for example, a tubular member and serves as a flow path through which the coolant 31 flows. One end 50*a* of the bypass flow path 50 is connected to the other end 20*b* of the coolant supply flow path 20 and one end 60*a* of the radiator flow path 60. The other end 50*b* of the bypass flow path 50 is connected to the rotary valve 70. The bypass flow path 50 connects the coolant supply flow path 20 to the coolant discharge flow path 40.

The radiator flow path 60 supplies the coolant 31 to the radiator 67. The radiator flow path 60 is, for example, a tubular member and serves as a flow path through which the coolant 31 flows. One end 60*a* of the radiator flow path 60 is connected to the other end 20*b* of the coolant supply flow path 20 and one end 50*a* of the bypass flow path 50. The other end 60*b* of the radiator flow path 60 is connected to the rotary valve 70. The radiator flow path 60 is disposed in parallel to the bypass flow path 50 and passes through the radiator 67.

The radiator 67 is an apparatus that releases the heat of the coolant 31 which has been warmed by cooling the fuel cell 10. That is, the radiator 67 radiates the heat of the coolant 31 flowing inside by heat conduction to surrounding air and the like. In order to increase a surface area of the radiator 67 that is brought into contact with the coolant 31 flowing inside, the radiator 67 has, for example, a structure in which the coolant 31 flows through a large number of thin tubes, a structure in which the coolant 31 flows through a serpentine tube, and a structure in which the coolant 31 flows inside a plate-shaped heat radiation plate.

A radiator fan 65 is disposed adjacent to one side of the radiator 67 facing the radiator 67. The radiator fan 65 is controlled by the system control ECU 80. The grille shutter 68 is disposed adjacent to the other side of the radiator 67 facing the radiator 67. The grille shutter 68 is a shutter mechanism and is controlled by the control unit 81 of the system control ECU 80. The arrangement of the radiator 67, the radiator fan 65, and the grille shutter 68 in the fuel cell vehicle will be described later. The control method of the grille shutter 68 by the control unit 81 will be described later.

The rotary valve 70 is connected to the coolant discharge flow path 40, the bypass flow path 50, and the radiator flow path 60. The rotary valve 70 includes, for example, one inflow port 70*a* and two outflow ports 70*b* and 70*c*. The inflow port 70*a* is connected to the other end 40*b* of the coolant discharge flow path 40, and the two outflow ports 70*b* and 70*c* are connected to the other end 50*b* of the bypass flow path 50 and the other end 60*b* of the radiator flow path 60, respectively. The rotary valve 70 is controlled to open and close by the system control ECU 80.

The rotary valve 70 separates the coolant 31 flowing through the coolant discharge flow path 40 into the one flowing through the bypass flow path 50 side and the one flowing through the radiator flow path 60 side. By doing so, the rotary valve 70 supplies the coolant 31 flowing through the coolant discharge flow path 40 to the bypass flow path 50 side or the radiator flow path 60 side. For example, the rotary valve 70 is fully opened toward the bypass flow path 50 side or the radiator flow path 60 side, and the coolant 31 flowing through the coolant discharge flow path 40 is supplied to the bypass flow path 50 side or the radiator flow path 60 side.

When the rotary valve 70 is fully opened toward the radiator flow path 60 side, the coolant 31 flowing through the coolant discharge flow path 40 does not flow through the bypass flow path 50 side and instead flows through the radiator flow path 60 side. On the other hand, when the rotary valve 70 is fully opened toward the bypass flow path 50 side, the coolant 31 flowing through the coolant discharge flow path 40 does not flow through the radiator flow path 60 and instead flows through the bypass flow path 50 side.

Note that the system control ECU 80 may control the rotary valve 70 in such a way that it controls the ratio of separating the coolant 31, distributes a part of the coolant 31 to the bypass flow path 50 side, and distributes the remaining part of the coolant 31 to the radiator flow path 60 side.

The system control ECU 80 is connected to the temperature sensor 41 via a signal line. The system control ECU 80 acquires information about the temperature of the coolant 31 through this connection. Further, the system control ECU 80 is connected to the pump sensor 32 via a signal line. The system control ECU 80 acquires information about the rotational speed and the power consumption of the coolant pump 30 through this connection. Further, the system control ECU 80 is connected to the rotary valve 70 and the coolant pump 30 via signal lines. Then, the system control ECU 80 controls an operation of opening and closing the rotary valve 70 and an operation of the coolant pump 30.

The system control ECU 80 separates the coolant 31 flowing through the coolant discharge flow path 40 into the one flowing the bypass flow path 50 side or the radiator flow path 60 side based on the information about the temperature of the coolant 31. For example, the system control ECU 80 controls the opening and closing of the rotary valve 70 in such a way that the ratio of the coolant 31 flowing through the radiator flow path 60 is increased as the temperature of the coolant 31 increases. The system control ECU 80 also controls the rotary valve 70 to open and close in such a way to increase the ratio of the coolant 31 flowing through the radiator flow path 60, for example, when a heat generation amount of the fuel cell 10 is increased.

In the fuel cell system 1, in order to ensure the next startability, the power generation of the fuel cell 10 is stopped after an ignition switch (a key switch) of the fuel cell vehicle is turned off (IG-OFF), and fuel cell termination processing is carried out. In the fuel cell termination processing, scavenging (purging) inside the fuel cell 10, inside the hydrogen piping, and inside each valve is performed, and leak checking of the hydrogen piping connecting the hydrogen tank to the fuel cell 10, etc. is performed.

Next, the arrangement of the radiator 67, the radiator fan 65, and the grille shutter 68 in the fuel cell vehicle will be described.

Figure 2:
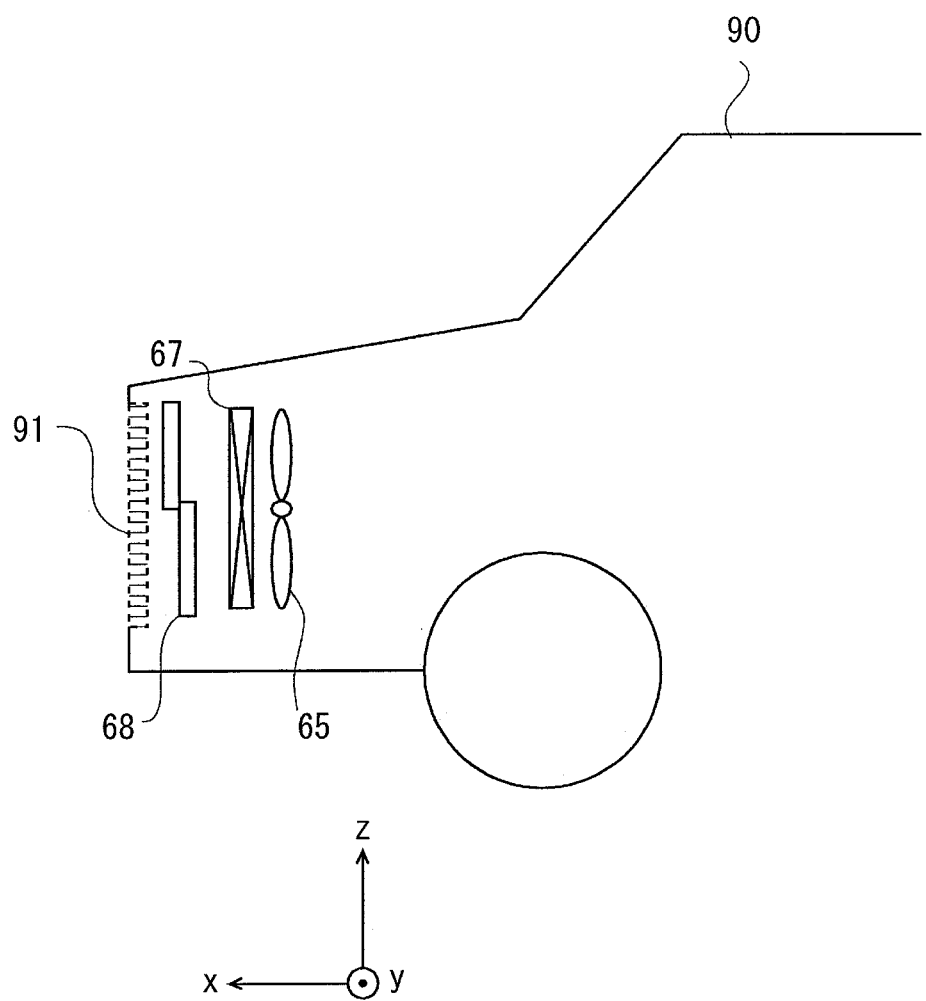
FIG. 2 is a schematic diagram showing an example of an arrangement of a radiator, a radiator fan, and a grille shutter in the fuel cell vehicle according to the embodiment.

FIG. 2 is a schematic diagram showing an example of the arrangement of the radiator 67, the radiator fan 65, and the grille shutter 68 in the fuel cell vehicle 90. In FIG. 2, the X axis positive direction is the front of the vehicle, the X axis negative direction is the rear of the vehicle, the Y axis positive direction is the left side of the vehicle, the Y axis negative direction is the right side of the vehicle, the Z axis positive direction is the upper side of the vehicle, and the Z axis negative direction is the lower side of the vehicle.

As shown in FIG. 2, a front grille 91 serving as an air intake is provided in front of the vehicle in the fuel cell vehicle 90. The radiator 67 is disposed on the rear side of the vehicle with respect to the front grille 91. The grille shutter 68 is disposed between the front grille 91 and the radiator 67. That is, when the grille shutter 68 is opened while the fuel cell vehicle 90 is traveling, traveling wind flows into the radiator 67 from the front grille 91, while when the grille shutter 68 is closed, the traveling wind from the front grille 91 to the radiator 67 is blocked.

The radiator fan 65 is provided on the rear side of the vehicle with respect to the radiator 67, and forms an air flow flowing from the front of the vehicle toward the rear of the vehicle. The air flow formed by the radiator fan 65 passes through the radiator 67. Thus, it is possible to efficiently radiate the heat of the coolant 31 in the radiator 67.

Next, control of the grille shutter 68 by the impedance will be described. In the following descriptions, FIG. 1 will be referred to as appropriate.

The electrolyte membrane included in the FC stack in the fuel cell 10 exhibits satisfactory proton conductivity in an appropriate wet state. For this reason, it is necessary to maintain the inside of the fuel cell 10 in an appropriate wet state during the operation of the fuel cell system 1. The wettability of the electrolyte membrane can be known from the impedance. That is, the smaller the wettability of the electrolyte membrane (the less the moisture content in the electrolyte membrane, i.e., slightly dry), the larger the impedance becomes. The larger the wettability of the electrolyte membrane (the more the moisture content in the electrolyte membrane, i.e., slightly wet), the smaller the impedance becomes. The generated current of the fuel cell stack is varied using this characteristic, for example, with a sine wave of 1 kHz, and then fluctuations in a voltage are observed. Then, the impedance is obtained by dividing an AC voltage amplitude of 1 kHz by an AC current amplitude, and the wettability of the electrolyte membrane can be acquired based on this impedance.

Figure 3:
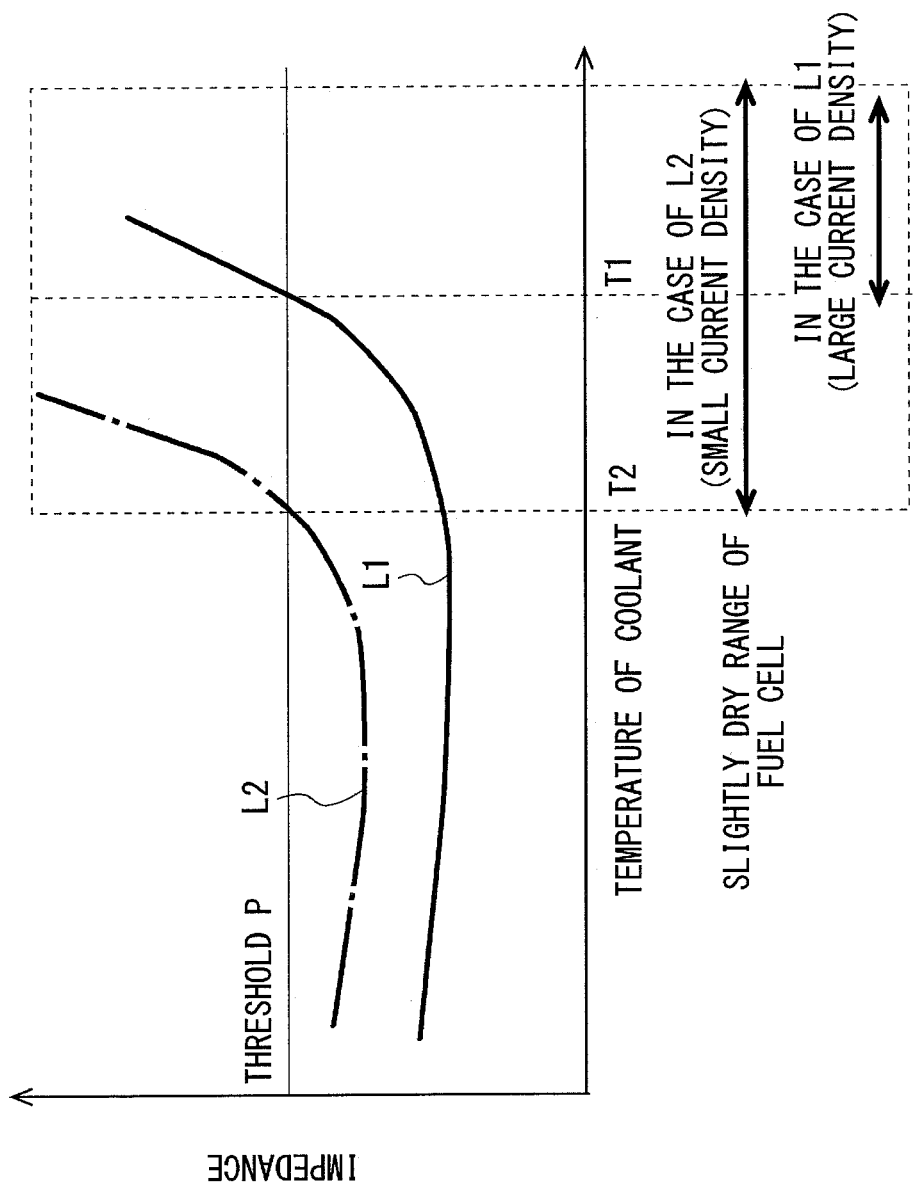
FIG. 3 is a schematic diagram for describing a relationship between a temperature of a coolant for cooling a fuel cell and an impedance.

FIG. 3 is a schematic diagram for describing a relationship between the temperature of the coolant 31 for cooling the fuel cell 10 and the impedance. In this graph, the horizontal axis represents the temperature of the coolant 31, and the vertical axis represents the impedance. Further, at a predetermined cell voltage, an impedance when the current density of the fuel cell 10 is relatively large is indicated by a solid line L1, and an impedance when the current density of the fuel cell 10 is relatively small is indicated by a one-dot chain line L2. A predetermined threshold P is a reference value for determining whether the electrolyte membrane of the fuel cell 10 is in the appropriate wet state and is set according to the relationship between the impedance and the wet state of the fuel cell. The current density is an amount of current [A/cm$^2$] generated by power generation per unit area of the unit cell.

As shown in FIG. 3, the temperature of the coolant 31 when the impedance rises to the predetermined threshold is T1 for L1 where the current density of the fuel cell 10 is relatively large, whereas the temperature of the coolant 31 when the impedance rises to the predetermined threshold is T2 for L2 where the current density of the fuel cell 10 is relatively small (T1>T2). That is, in the case of L2 where the current density of the fuel cell 10 is relatively small, the moisture in the electrolyte membrane included in the fuel cell 10 becomes slightly low at a temperature of the coolant 31 lower than the temperature thereof at which the moisture in the electrolyte membrane becomes less in the case of L1 where the current density of the fuel 10 is relatively large.

In order to lower the impedance, i.e., to increase the wettability of the electrolyte membrane, it is necessary to open the grille shutter 68 to let traveling air flow from the front grille 91 to the radiator 67 so as to cool the radiator 67. However, if the grille shutter 68 is controlled based on the temperature of the coolant 31, as described above, the fuel cell 10 may not be kept in the appropriate wet state when the current density of the fuel cell 10 changes. Thus, in the fuel cell vehicle 90 according to this embodiment, the grille shutter 68 is controlled based on the impedance.

Next, the flow of the control processing of the grille shutter 68 will be described. In the following descriptions, FIG. 1 will be referred to as appropriate.

Figure 4:
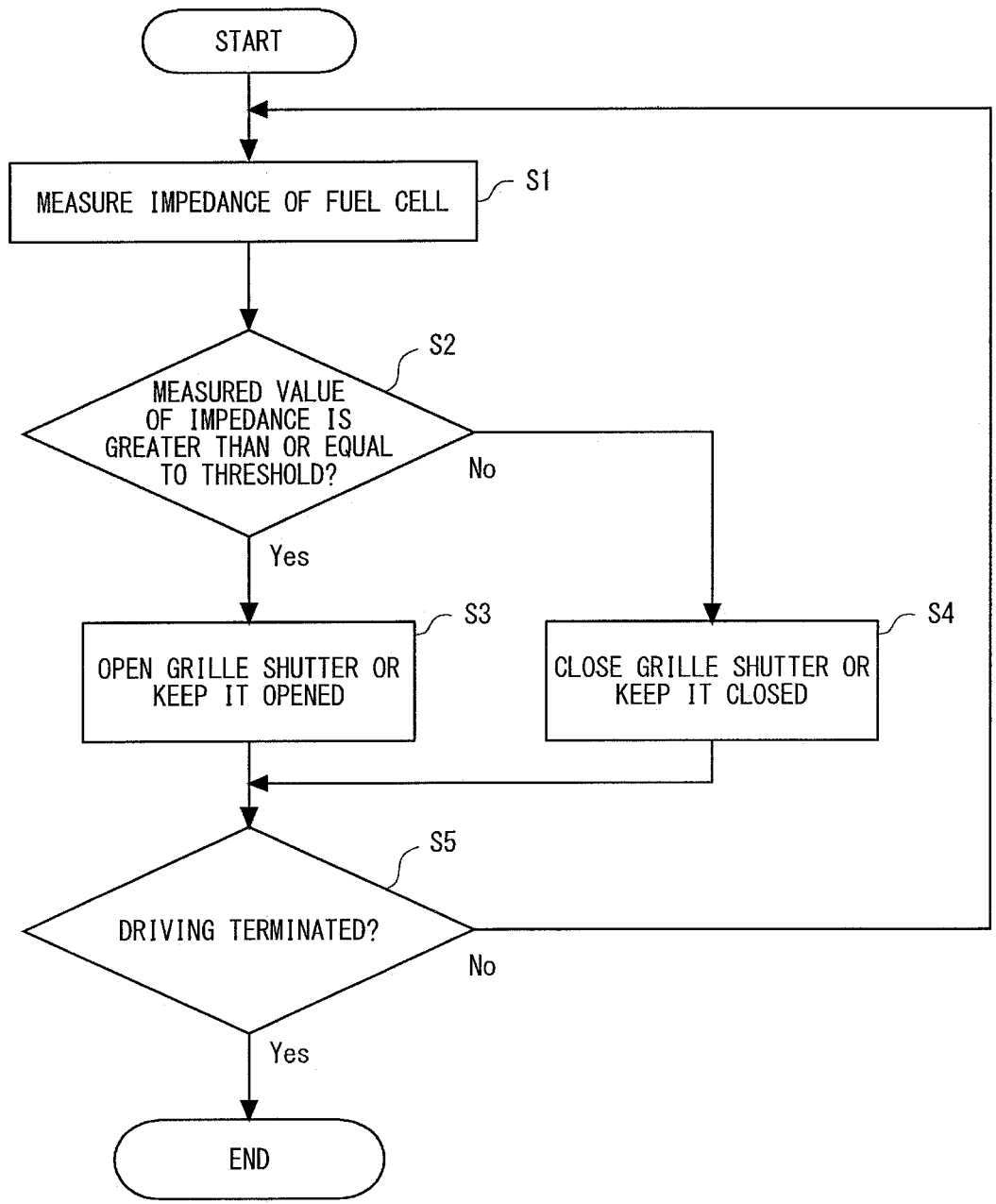
FIG. 4 is a flowchart showing a flow of control processing of the grille shutter.

FIG. 4 is a flowchart showing the flow of the control processing of the grille shutter 68. As shown in FIG. 4, firstly the impedance of the fuel cell 10 is measured by the impedance sensor 12 (Step S1). Next, the control unit 81 determines whether a measured value of the impedance is greater than or equal to the predetermined threshold (Step S2).

When it is determined in Step S2 that the measured value of the impedance is greater than or equal to the predetermined threshold (YES in Step S2), the control unit 81 performs control so as to open the grille shutter 68 or keep it opened (Step S3). When it is determined in Step S2 that the measured value of the impedance is less than the predetermined threshold (NO in Step S2), the control unit 81 performs control so as to close the grille shutter 68 or keep it closed (Step S4).

After Steps S3 and S4, the control unit 81 determines whether the driving of the fuel cell vehicle 90 has been terminated (Step S5). Here, the termination of the driving of the fuel cell vehicle 90 means that the ignition switch is turned off. When it is determined in Step S5 that the driving of the fuel cell vehicle 90 has been terminated (YES), the process is terminated. When it is determined in Step S5 that the driving of the fuel cell vehicle 90 has not been terminated (YES), the process returns to Step S1.

As described so far, in the fuel cell vehicle 90 according to this embodiment, the impedance of the fuel cell 10 is measured, and the grille shutter 68 is opened when the measured value of the impedance becomes greater than or equal to the predetermined threshold. As described above, the wettability of the electrolyte membrane of the fuel cell 10 can be acquired based on the impedance. That is, when the impedance rises above the predetermined threshold, it can be determined that the electrolyte membrane is slightly dry. By measuring the impedance of the fuel cell 10 using the impedance sensor 12 and opening the grille shutter 68 when the measured value of the impedance becomes greater than or equal to the predetermined threshold, the fuel cell 10 can be maintained in the appropriate wet state.

Modified Example 1

The flow of the control processing of the grille shutter 68 according to Modified Example 1 will be described below. In the following descriptions, FIG. 1 will be referred to as appropriate.

Figure 5:
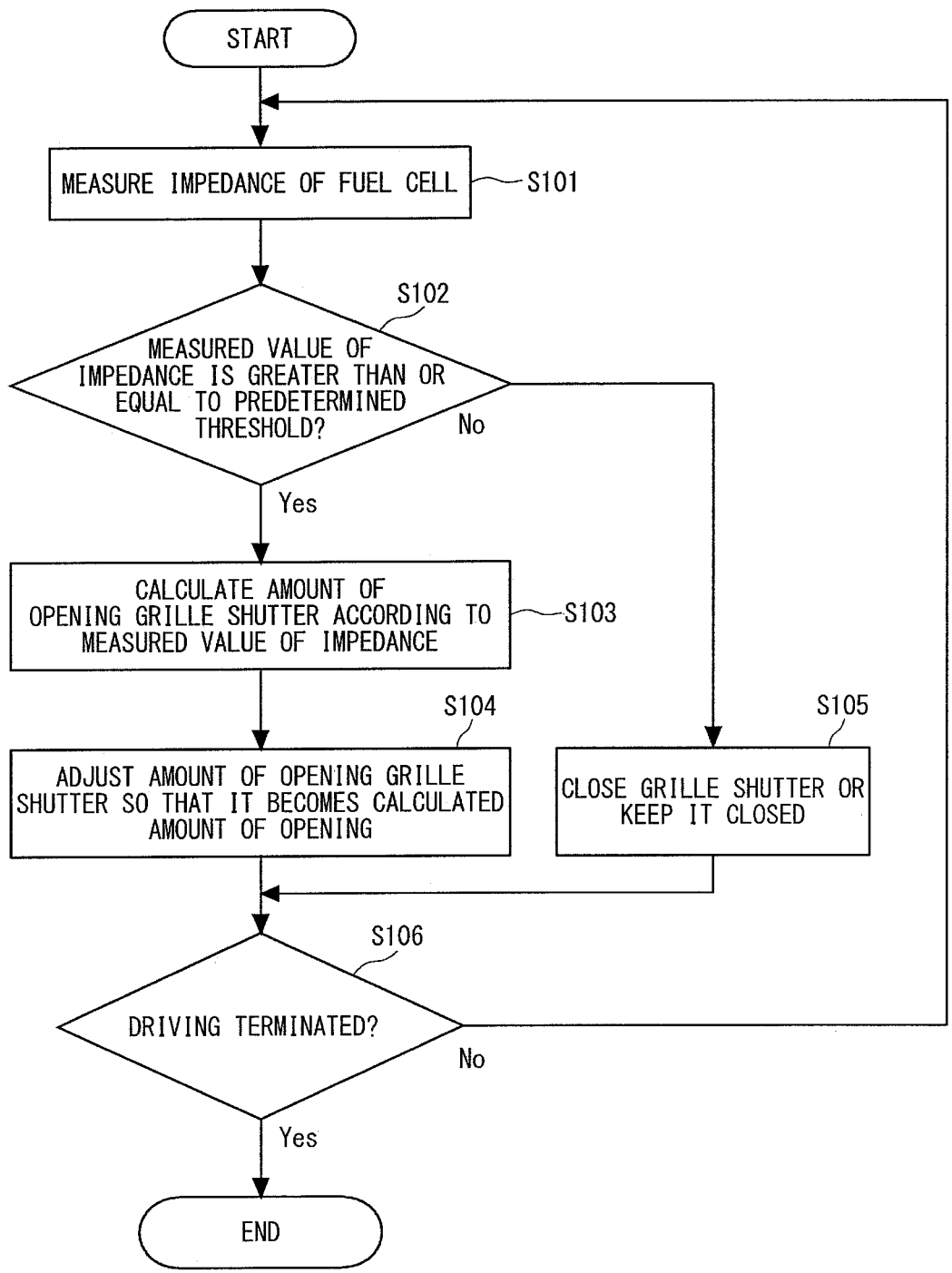
FIG. 5 is a flowchart showing a flow of control processing of a grille shutter according to Modified Example 1.

FIG. 5 is a flowchart showing the flow of control processing of the grille shutter 68 according to the first modification. As shown in FIG. 5, firstly, the impedance of the fuel cell 10 is measured by the impedance sensor 12 (Step S101). Next, the control unit 81 determines whether the impedance measurement value is greater than or equal to the predetermined threshold (Step S102).

When it is determined in Step S102 that the measured value of the impedance is greater than or equal to the predetermined threshold (YES in Step S102), the control unit 81 calculates an amount of opening the grille shutter 68 according to the impedance measurement value (Step S103). Next, the control unit 81 adjusts the amount of opening the grille shutter 68 so that it becomes the calculated amount of opening (Step S104). When it is determined in Step S102 that the measured value of the impedance is less than the predetermined threshold (NO in Step S102), the control unit 81 performs control so as to close the grille shutter 68 or keep it closed (Step S105).

After Steps S104 and S105, the control unit 81 determines whether the driving of the fuel cell vehicle 90 has been terminated (Step S106). When it is determined in Step S106 that the driving of the fuel cell vehicle 90 has been terminated (YES), the process is terminated. When it is determined in Step S106 that the driving of the fuel cell vehicle 90 has not been terminated (YES), the process returns to Step S101.

When the grille shutter 68 is opened to let traveling wind flow from the front grille 91, the wettability of the electrolyte membrane of the fuel cell 10 can be increased but also a traveling resistance of the fuel cell vehicle 90 is increased. Thus, it is preferable to make the flow rate of traveling wind flowing from the front grille 91 necessary and sufficient. By adjusting the amount of opening the grille shutter 68 according to the value of the impedance when the impedance of the electrolyte membrane of the fuel cell 10 rises to the predetermined threshold or greater, it is possible to more appropriately maintain the wet state of the fuel cell 10.

Note that the present disclosure is not limited to the above-described embodiment, and can be appropriately changed without departing from the spirit of the present disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell vehicle comprising:
    a fuel cell;
    a radiator provided in a coolant circulation flow path for circulating a coolant through the fuel cell and configured to radiate heat of the coolant which has been warmed by cooling the fuel cell;
    a grille shutter configured to adjust a flow rate of air taken into the radiator from an air intake;
    a sensor configured to measure an impedance of the fuel cell; and
    a control unit configured to control the grille shutter to open and close, wherein
    the control unit controls the grille shutter to open when a measured value of the impedance becomes greater than or equal to a predetermined threshold, and adjusts an amount of opening of the grille shutter according to the measured value of the impedance.

2. The fuel cell vehicle according to claim 1, wherein the predetermined threshold is set according to a relationship between the impedance and a wet state of the fuel cell.

\* \* \* \* \*